Patented Feb. 15, 1949

2,461,971

UNITED STATES PATENT OFFICE 2,461,971

ASPHALT WITH IMPROVED ADHESION PROPERTIES FOR AGGREGATES

Herbert G. M. Fischer, Westfield, N. J., assignor, by mesne assignments, to Standard Catalytic Company, a corporation of Delaware No Drawing. Application September 27, 1941, Serial No. 412,598

8 Claims. (Cl. 106—269)

This invention relates to improvements in the adhesivity of bitumens when applied as a bonding agent to mineral aggregates, metals, such as pipe lines, etc., especially when the mineral aggregates, metals, etc., are moist or wet.

It is known according to U. S. Patent No. 2,191,295 that issued February 20, 1940, to Hans Dohse and Fritz Spoun, that the treatment of bitumen such as asphalt, with cation-active organic derivatives of ammonia containing at least one lipophilic radical directly attached to a nitrogen atom of said ammonia derivative by means of a nitrogen to carbon bond, such as the high molecular weight aliphatic amines, $C_8$ or higher, improves their ability to coat and adhere to mineral aggregates but the treatment necessary to obtain good results is quite expensive and is somewhat selective of the mineral aggregates to which the treated asphalt is applied. On many alkaline type aggregates, such as limestone, the amine treated asphalt does not exhibit the necessary high resistance to stripping by water. The amines used according to the above patent are ones containing at least one lipophilic radical in the molecule or analogous compounds derived from phosphorus, arsenic, antimony or sulfur. The derivatives of ammonia which have several substituents on the nitrogen are found to be most active. At least one of these substituents on the nitrogen is preferably a lipophilic radical as for example an alkyl radical of high molecular weight. The hydrocarbon radicals may also carry other substituents, for example they may contain a halogen.

An object of this invention is to obtain at least the same or a greater improvement in the adhesivity of the asphalt by the use of addition compounds which are not as expensive as used according to the above patent.

Another object of the invention is to obtain a greater improvement in the ability of the asphalt to wet either acidic, neutral or alkaline aggregates.

According to this invention, improved results are obtained by the treatment of the bitumen such as an asphalt with a proper combination of both an aliphatic amine containing at least one lipophilic radical in the molecule and an organic acid having at least 8 carbon atoms to the molecule, preferably a fatty acid such as oleic acid, over the use of the same percentages of either the amine or the organic acid alone. The fatty acid used is preferably one having from 16 to 20 carbon atoms to the molecule. The fatty acid employed may be used in amounts of at least 0.1%. The combination treatment effects a considerable saving in the cost of treatment for the same improvement in both the coating and adhesion ability since smaller amounts of the more expensive amine may be used. The activity of the fatty acid enhances the wetting and adhesion ability of the amine even though only 25–70% as much of the amine is used in this combination. These combination treatments produce bonding agents which are more constant in their behavior toward different aggregates, that is, giving good results when applied to either acidic, neutral or alkaline aggregates. This improvement is illustrated by the following Table I for a Venezuelan rapid curing type 2 cut-back asphalt applied to two wet aggregates, a limestone from Ohio and a gravel from New York.

Table I

| Lauryl Amine | Oleic Acid | Stripping Resistance | |
|---|---|---|---|
| | | Ohio Limestone | New York Gravel |
| Per cent | Per cent | Per cent | Per cent |
| 0.0 | 0.0 | 0 | 10 |
| 0.1 | 0.0 | 10 | 50 |
| 0.1 | 0.2 | 25 | 50 |
| 0.1 | 0.4 | 20 | 60 |
| 0.1 | 0.8 | 40 | 65 |
| 0.1 | 1.6 | 55 | 75 |
| 0.2 | 0.0 | 10 | 65 |
| 0.2 | 0.2 | 70 | 90 |
| 0.2 | 0.4 | 80 | 90 |
| 0.2 | 0.8 | 85 | 90 |
| 0.2 | 1.6 | 90 | 95 |
| 0.3 | 0.0 | 15 | 75 |
| 0.3 | 0.2 | 85 | 95 |
| 0.3 | 0.4 | 95 | 100 |
| 0.3 | 0.8 | 95 | 100 |
| 0.3 | 1.6 | 95 | 100 |
| 0.4 | 0.0 | 25 | 90 |
| 0.0 | 1.6 | 35 | 5 |

The above figures illustrate the considerable increase in stripping resistance which the combination of the amine and oleic acid affords. For example, a treatment of the cutback with 0.2% by weight of the amine and 0.8% oleic acid gives much better results on the limestone than 0.4% of amine alone as well as equal results on the gravel. This combination treatment can be made at approximately ⅔ the cost of the 0.4% amine treatment and furthermore yields a treated asphalt which operates with equal effectiveness on both alkaline and acidic aggregates.

The following data illustrate the improved effectiveness of the combination treatment as compared with straight amine treated when applied to different wet aggregates:

Table II

| Aggregate | | Stripping Resistance | | |
|---|---|---|---|---|
| | | Wet Stone | | |
| Type | Source | Combination Treatment[1] | 0.4% Lauryl Amine | 0.25% Lauryl Amine |
| Trap Rock | New Jersey | 95 | 85 | 40 |
| Gravel | New York | 95 | 90 | 70 |
| Do | Maine | 95 | 90 | |
| Do | Virginia | 100 | 100 | |
| Do | West Virginia | 90 | 90 | |
| Granite | North Carolina | 100 | 90 | |
| Limestone #1 | New York | 100 | 70 | |
| Limestone #2 | do | 95 | 80 | |
| Limestone #3 | do | 95 | 30 | |
| Limestone | Ohio | 90 | 25 | 10 |

[1] 0.25% Lauryl Amine; 0.4% Oleic Acid.

The combination of agents which may be employed is not restricted to the materials given above since combinations of other primary secondary or tertiary amines, amidines, imidazolines or amides may be used with other fatty acids, having at least 12 carbon atoms to the molecule, such as abietic acid, tallöl or Swedish liquid rosin, rosin, naphthenic acids, or waxes of the acidic type such as japan wax, montan wax, etc. The amine compounds should preferably have alkyl groups containing 6 or more carbon atoms, and aromatic amino compounds may be employed. The relative proportions of the amine compounds and the acidic materials must be found by experiment since the simple combination of these two materials in metathetical proportions may not always give the most effective results as illustrated by the following tables:

Table III

| Percent Lauryl Amine | Percent Indusoil | Stripping Resistance | |
|---|---|---|---|
| | | Ohio Limestone | Gravel |
| 0.2 | 0.0 | 15 | 85 |
| 0.2 | 0.2 | 70 | 95 |
| 0.2 | 0.4 | 85 | 95 |
| 0.2 | 0.8 | 80 | 100 |
| 0.2 | 1.6 | 70 | 100 |
| 0.3 | 0.0 | 25 | 100 |
| 0.3 | 0.2 | 90 | 100 |
| 0.3 | 0.4 | 90 | 100 |
| 0.3 | 0.8 | 95 | 100 |
| 0.3 | 1.6 | 95 | 95 |

Indusoil is principally oleic, linoleic and some rosin acids.

Table IV

| Percent Lauryl Amine | Percent Tallöl | Stripping Resistance | |
|---|---|---|---|
| | | Ohio Limestone | Gravel |
| 0.0 | 1.6 | 15 | 0 |
| 0.1 | 0.0 | 5 | 50 |
| 0.1 | 0.2 | 10 | 55 |
| 0.1 | 0.4 | 20 | 60 |
| 0.1 | 0.8 | 50 | 70 |
| 0.1 | 1.6 | 30 | 40 |
| 0.2 | 0.0 | 15 | 65 |
| 0.2 | 0.2 | 50 | 90 |
| 0.2 | 0.4 | 65 | 95 |
| 0.2 | 0.8 | 80 | 95 |
| 0.2 | 1.6 | 75 | 95 |
| 0.3 | 0.0 | 20 | 75 |
| 0.3 | 0.2 | 70 | 95 |
| 0.3 | 0.4 | 90 | 100 |
| 0.3 | 0.8 | 95 | 100 |
| 0.3 | 1.6 | 90 | 100 |

Tallöl is a Swedish liquid rosin oil.

In the above table, the term "stripping resistance" is defined as the percentage of the aggregate surface still remaining coated with asphalt after the coated mixture has been cured for 1 hour at room temperature and then placed in water maintained at room temperature for a period of 20 hours.

The agents may be added to the asphalt by different methods, e. g., they may be added separately or together to the asphalt, either directly or in mixture with a suitable oil or solvent.

The aliphatic amine and the organic acid may, if desired, be first applied to the mineral aggregate or metal before the asphalt or other bituminous material is applied. Likewise one of these ingredients either the aliphatic amine or the organic acid may be incorporated in the asphalt and the other material dissolved in a solvent or flux oil used to wet the mineral aggregate but as the amounts of aliphatic amine and the organic acid used are small compared to the asphalt or bituminous material, it is preferred that these two ingredients be incorporated in the bituminous material before it is used to coat or bond the mineral aggregate or the metallic surface.

I claim:

1. An improved bonding bituminous material which comprises an asphalt containing 0.1% to 0.4% of aliphatic amine and 0.1% to 1.6% of higher fatty acid.

2. An improved bonding bituminous material which comprises an asphalt containing 0.1% to 0.4% of lauryl amine and 0.1% to 1.6% of oleic acid.

3. An improved bonding bituminous material which comprises an asphalt containing 0.25% of lauryl amine and 0.4% of oleic acid.

4. An improved bonding bituminous material which comprises an asphalt containing 0.3% of lauryl amine and 0.8% of oleic acid.

5. An improved bonding bituminous material which comprises an asphalt containing 0.3% of lauryl amine and 1.6% of oleic acid.

6. An improved bonding asphaltic material which comprises an asphaltic substance in combination with an aliphatic amine containing at least one lipophilic radical directly attached to a nitrogen atom and an organic acid containing at least 8 carbon atoms to the molecule.

7. An improved bonding asphaltic material which comprises an asphaltic substance in combination with an amine containing at least one alkyl radical of at least 6 carbon atoms directly attached to a nitrogen atom of said amine by means of a nitrogen to carbon bond and an organic acid containing at least 8 carbon atoms to the molecule.

8. A composition according to claim 7 in which said organic acid is a fatty acid containing 16 to 20 carbon atoms to the molecule.

HERBERT G. M. FISCHER.

REFERENCES CITED

The following references are of record in the file of this patent:

UNITED STATES PATENTS

| Number | Name | Date |
|---|---|---|
| 1,674,523 | Sadtler | June 19, 1928 |
| 2,040,671 | Richardson | May 12, 1936 |
| 2,191,295 | Dohse et al. | Feb. 20, 1940 |

FOREIGN PATENTS

| Number | Country | Date |
|---|---|---|
| 429,548 | Great Britain | May 31, 1935 |